US009680761B2

(12) United States Patent
Abbott

(10) Patent No.: US 9,680,761 B2
(45) Date of Patent: Jun. 13, 2017

(54) CONSOLIDATING MESSAGES IN A MESSAGE QUEUE

(71) Applicant: Dropbox, Inc., San Francisco, CA (US)

(72) Inventor: Timothy Abbott, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 249 days.

(21) Appl. No.: 14/459,878

(22) Filed: Aug. 14, 2014

(65) Prior Publication Data

US 2016/0050157 A1    Feb. 18, 2016

(51) Int. Cl.
*G06F 15/173* (2006.01)
*G06F 15/16* (2006.01)
*H04L 12/863* (2013.01)
*H04L 12/805* (2013.01)
*G06F 15/177* (2006.01)
*H04L 12/58* (2006.01)

(52) U.S. Cl.
CPC .......... *H04L 47/624* (2013.01); *H04L 47/365* (2013.01); *H04L 51/04* (2013.01); *H04L 51/22* (2013.01)

(58) Field of Classification Search
CPC ..... H04L 47/624; H04L 47/365; H04L 51/04; H04L 51/22
USPC ........................................................ 709/223
See application file for complete search history.

(56) References Cited

U.S. PATENT DOCUMENTS

| | | | |
|---|---|---|---|
| 7,155,483 B1 * | 12/2006 | Friend .................... | H04W 28/06 709/206 |
| 8,682,895 B1 | 3/2014 | Goel et al. | |
| 9,105,000 B1 * | 8/2015 | White .............. | G06Q 10/06398 |
| 2003/0233485 A1 | 12/2003 | Khan | |
| 2006/0209868 A1 * | 9/2006 | Callaghan .............. | G06Q 10/00 370/428 |
| 2012/0159510 A1 * | 6/2012 | Kumar ..................... | G06F 9/544 718/105 |
| 2013/0218941 A1 | 8/2013 | Bushin | |
| 2014/0040182 A1 * | 2/2014 | Gilder ................ | G06F 17/30578 707/602 |

OTHER PUBLICATIONS

G. Cugola, et al., "Exploiting an event-based infrastructure to develop complex distributed systems", CEFRIEL—Politecnico di Milano, pp. 1-10.
Gerhard Goos, et al., "Distributed Computing", Lecture Notes in Computer Science, vol. 2180, Springer, 2001.

* cited by examiner

*Primary Examiner* — Melvin H Pollack
(74) *Attorney, Agent, or Firm* — Polsinelli PC

(57) ABSTRACT

In some implementations, state messages can be queued at a server device for transmission to a disconnected client device when the client device reconnects to the server device. To conserve resources, queued state messages can be consolidated, combined and/or deleted.

15 Claims, 7 Drawing Sheets

CONSOLIDATING MESSAGES IN A MESSAGE QUEUE

TECHNICAL FIELD

The disclosure generally relates to synchronizing data between devices.

BACKGROUND

Many modern software systems are configured to synchronize data between multiple devices so that a user has a consistent experience on each device. For example, content libraries can be synchronized between devices so that the user sees the same content library on each of the user's devices. Similarly, communication applications (e.g., chat systems, email applications, etc.) can be synchronized between user devices so that the state of the applications on each user device is consistent with other user devices. To maintain a consistent state between devices, state data needs to be shared between user devices. The state data can be transmitted between devices using state messages. However, sharing state data between devices can cause many state messages to be generated, transmitted, and/or stored thereby consuming limited resources of the computing devices configured to synchronize the state data.

SUMMARY

In some implementations, state messages can be queued at a server device for a disconnected client device and transmitted to the client device when the client device reconnects to the server device. To conserve resources, queued state messages can be consolidated, combined and/or deleted.

Particular implementations provide at least the following advantages: combining and replacing messages can reduce the storage and transmission resources required by messages in the message queue.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

While the description below describes various implementations for consolidating messages in a message queue in the context of a chat or instant messaging system, the concepts can be easily applied to other systems that rely upon sharing state information, or any other information, between devices. For example, the implementations described below can be used to consolidate state messages when synchronizing content or media libraries, email applications, or any other software.

Figure 1:
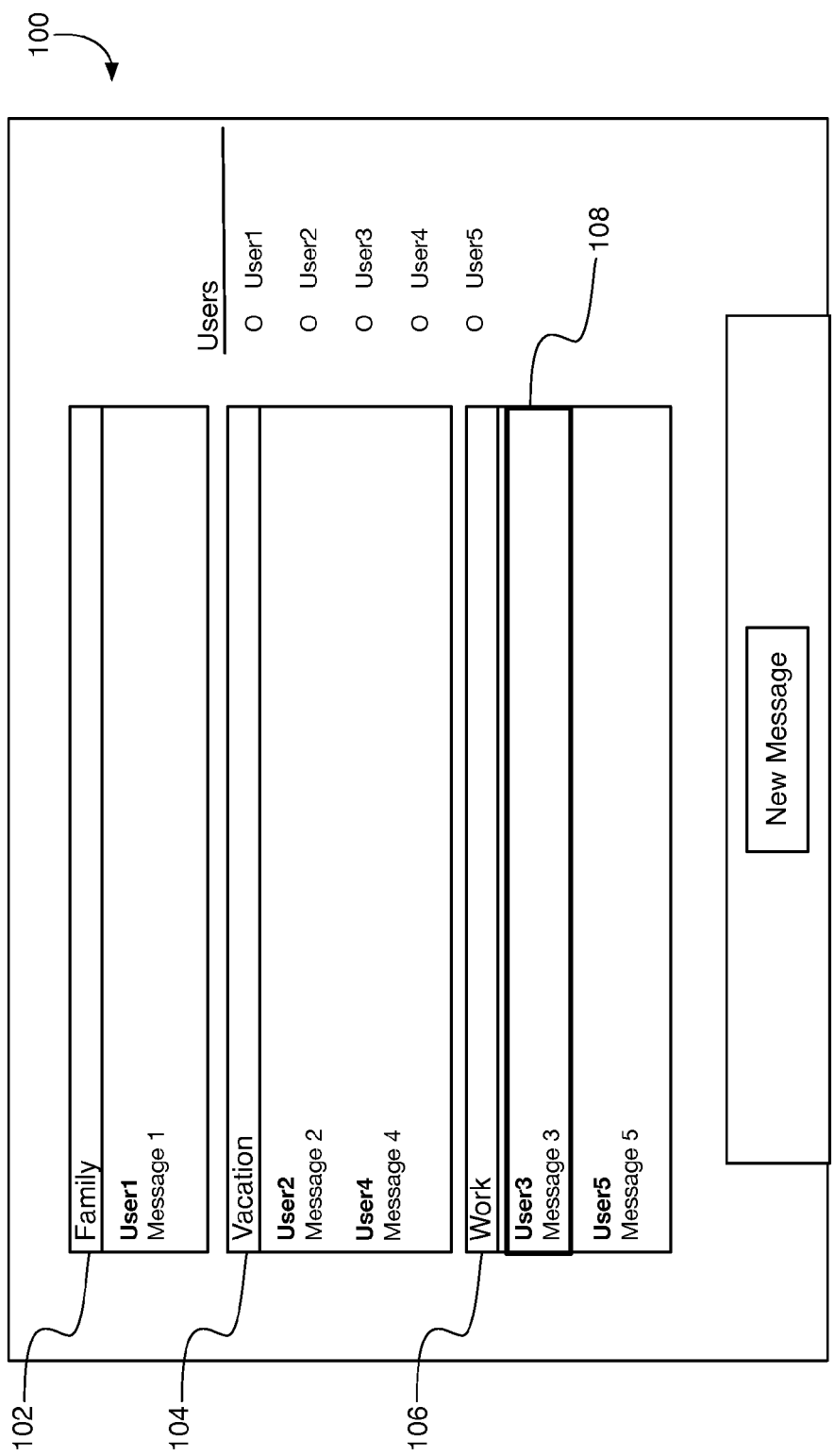
FIG. 1 illustrates an example graphical user interface for a chat application.

FIG. 1 illustrates an example graphical user interface 100 for a chat application. For example, GUI 100 can be presented on a display of a user device, such as a smartphone, tablet, desktop or laptop computer. The user can have multiple devices and GUI 100 can be displayed on each of the multiple devices at various times. For example, the user may display GUI 100 on a laptop computer at home and then, while travelling, the user may display GUI 100, or a similar GUI, on a smartphone or tablet computer.

In some implementations, state information regarding GUI 100 and/or the underlying application (e.g., chat application) can be synchronized between user devices so that the user will be presented with consistent data and a consistent look and feel while using different devices. In some implementations, GUI 100 can display different chat channels or streams 102, 104 and/or 106. For example, the chat channels can each be associated with a different topic (e.g., 102: Family; 104: Vacation; and 106: Work). While viewing GUI 100 on a laptop computer, for example, the user can change the background color of each chat channel so that one chat channel is easily distinguishable from another. The user can provide input to change the color of channel 102 to yellow, the color of channel 104 to green and the color of channel 106 to blue. Once the user has changed the colors of the chat channels, the color state information for each channel can be synchronized with other user devices (e.g., the smartphone) so that the user will see the same background color scheme that the user selected on the laptop reflected on other devices.

Similarly, message state can be shared between each of the user devices. For example, each chat channel can include messages associated with the chat channel. Each message can have an associated read or unread state. As the user reads each message (e.g., the message is displayed on the screen, or the user moves the cursor over the message) each message can change state from unread to read. Like the background color state, whenever a message's state is changed on one device (e.g., the user's laptop), the message's state can be synchronized with other devices (e.g., the user's smartphone) so that the message state is consistent between devices.

As another example, cursor location can be synchronized between devices. For example, as the user moves cursor 108 from chat message to chat message, the cursor location can be tracked by storing the identifier of the chat message corresponding to the current cursor location (e.g., message ID=3). To ensure a consistent user experience between devices, when the user moves a cursor on one device (e.g., a laptop computer), cursor state messages can be transmitted to another device (e.g., the user's smartphone) so that when the user views GUI 100 on the other device the cursor will be where the user expects the cursor to be. For example, the cursor on the smartphone will be on the same chat message where the user left the cursor when using the laptop computer.

In some implementations, different user devices can be synchronized in real time or near real time. For example, if the user has two devices (e.g., laptop and smartphone) connected to the same network (e.g., LAN, Internet, etc.) at the same time, then state messages can be transmitted between devices at near real time. When a change is made to GUI 100 on one device (e.g., laptop), the instance of GUI 100 on the second device (e.g., smartphone) can be updated to reflect the change almost immediately. However, when the second device is offline (e.g., not connected to a network capable of communicating with the first device), then the state messages destined for the second device must be queued for delivery once the second device comes back online.

Figure 2:
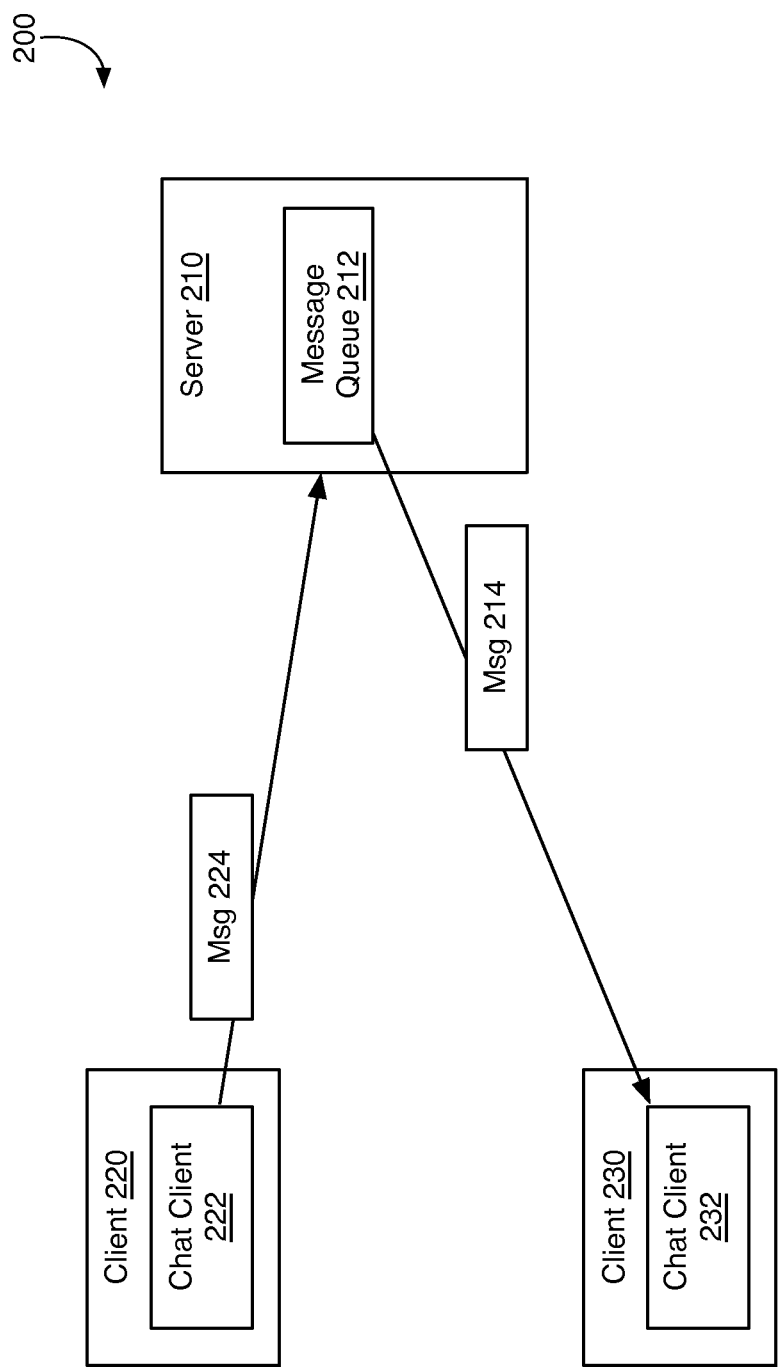
FIG. 2 illustrates a block diagram of a system for queuing and consolidating state messages.

FIG. 2 illustrates a block diagram of a system 200 for queuing and consolidating state messages. In some implementations, system 200 can include server device 210 and client devices 220 and 230. For example, client device 220 can be a laptop computer. Client device 230 can be a smartphone, for example.

In some implementations, server device 210 can host chat server software that can facilitate synchronizing state information between client device 220 and client device 230. For example, a user of client device 220 can interact with chat client 222 to cause the state of chat client 222 to change. For example, a user can interact with a graphical user interface (e.g., GUI 100) of chat client 222 to change the background color of chat channels, read messages and/or move the location of the cursor. When the state of chat client 222 changes, chat client 222 can send state message 224 to the chat server 210 to indicate the state changes.

In some implementations, when chat server 210 receives state message 224, chat server 210 can forward (e.g., retransmit) the state message 224 to chat client 232 on client device 230 so that chat client 232 can update its state to be consistent with the state of chat client 222 on client device 220. However, if client device 230 is offline (e.g., not connected to chat server 210, then chat server 210 can store the state messages in message queue 212 and deliver the messages 214 in the queue 212 to chat client 232 when client device 230 comes back online (e.g., reestablishes a connection to server 210).

Figure 3A:
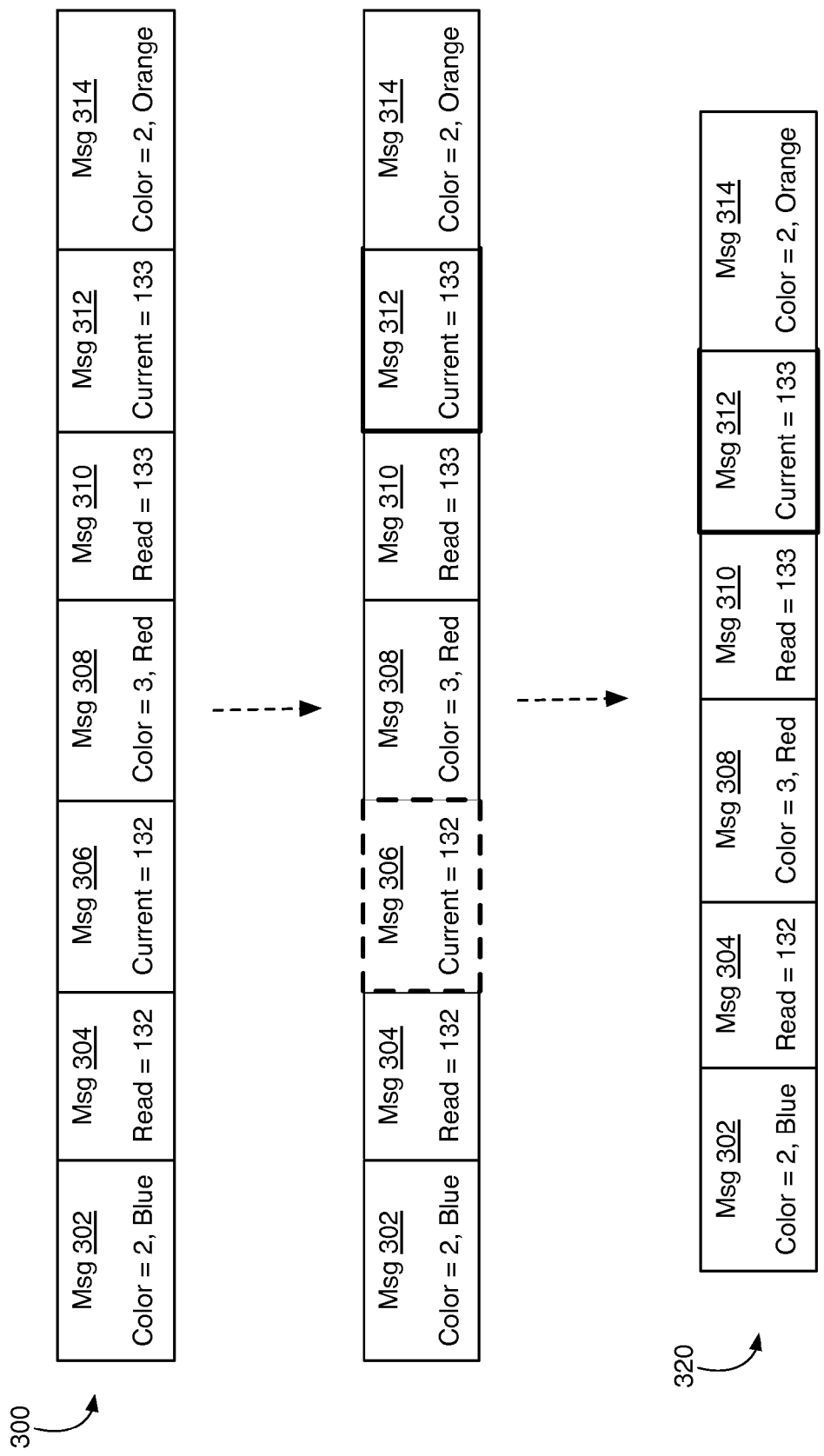
FIGS. 3A-3C illustrate combining messages in message queue.
Figure 3B:
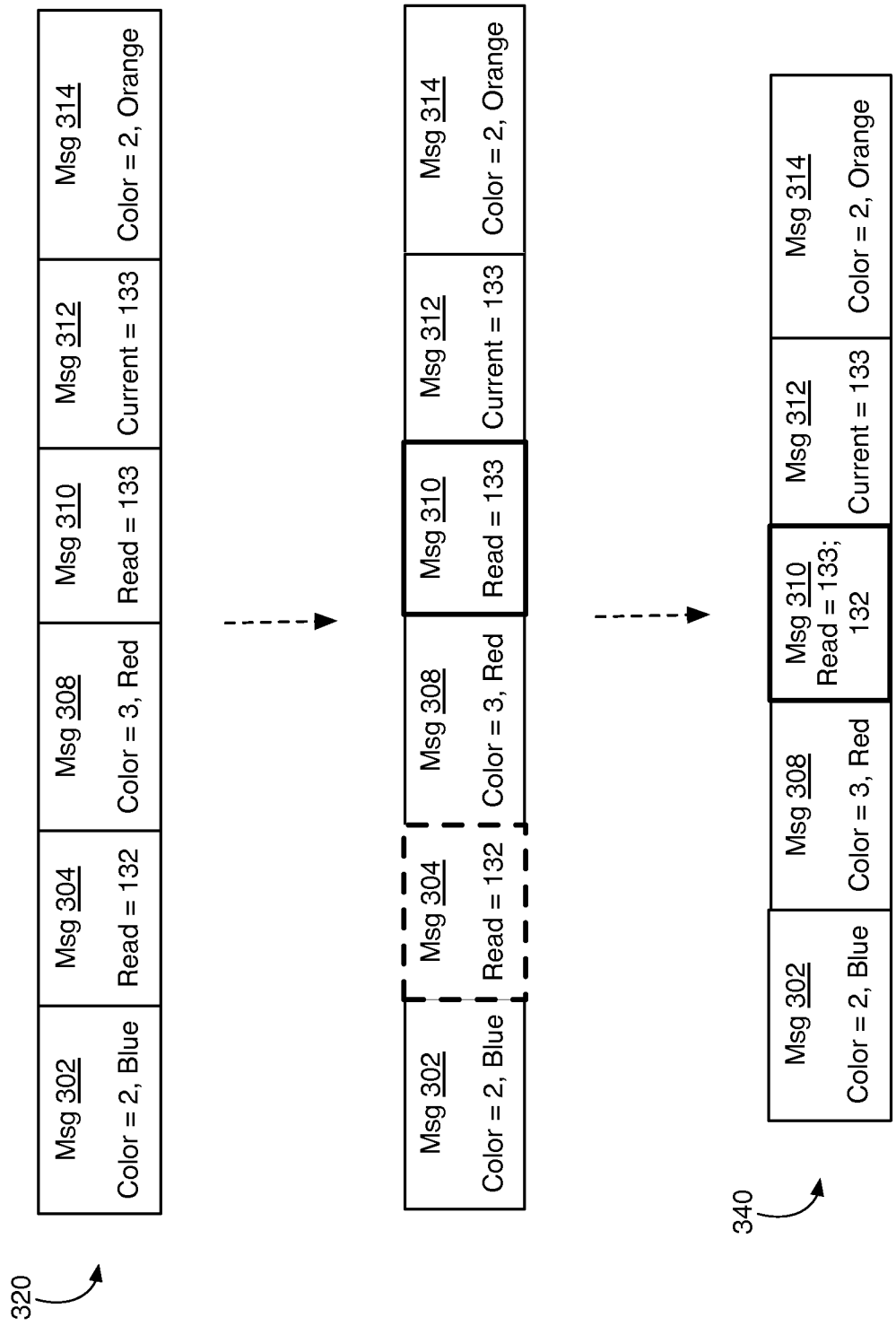
Figure 3C:
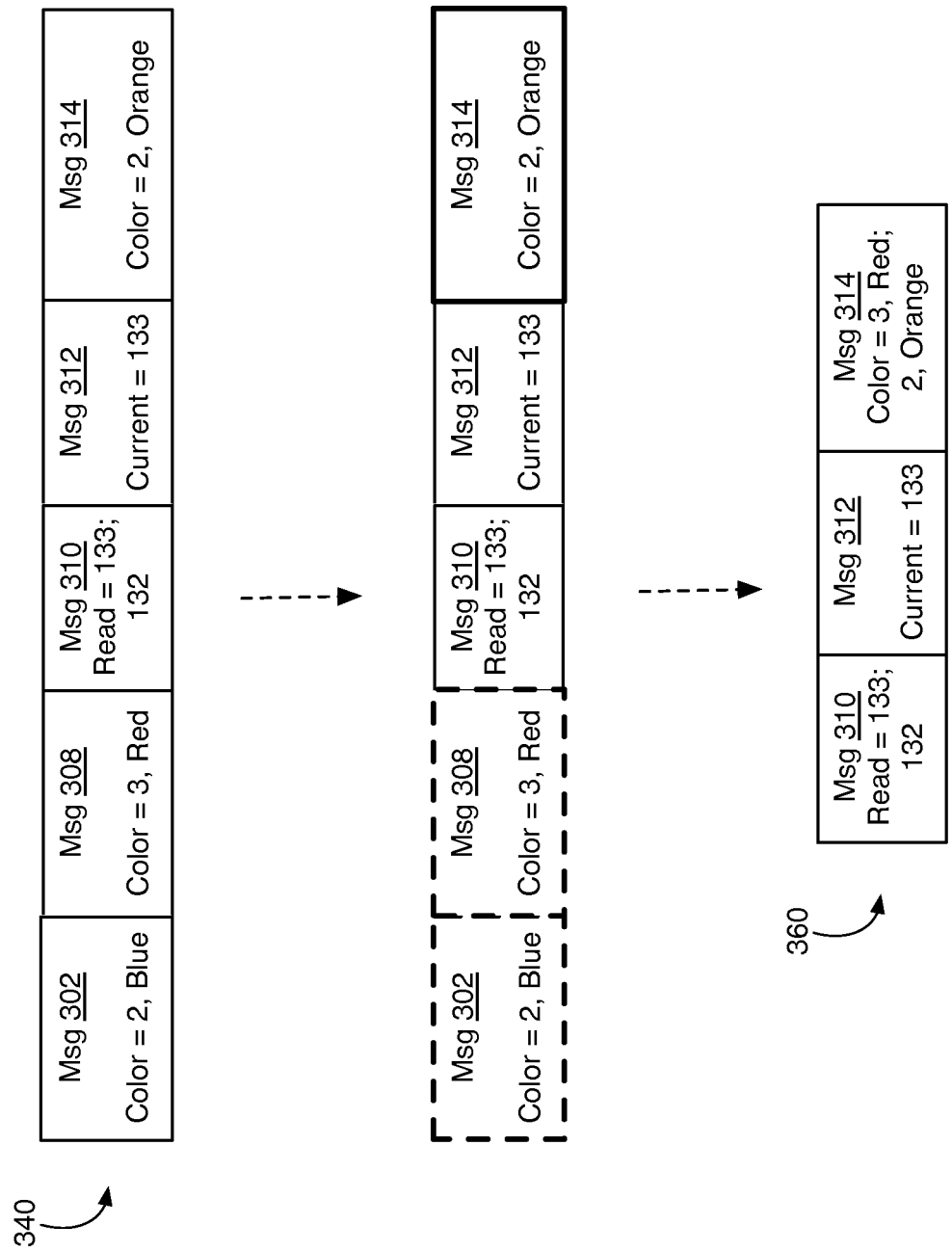

FIGS. 3A-3C illustrate combining messages in message queue 300. For example, message queue 300 can correspond to message queue 212 of FIG. 2. In some implementations, messages in message queue 212 can be consolidated to save storage space on server 210 and reduce the amount of bandwidth required to transmit state information to client 230. For example, some types of state messages are combinable with other messages of the same type. Examples of combinable state messages include read state messages (e.g., indicating whether a chat message, email message, etc., has been read or is unread) and background color change messages for different chat channels. Combinable state messages can be messages of the same type that indicate changes to attributes of different objects, for example.

Some types of state messages are replaceable or deletable messages. For example, since there is only one cursor, only the latest (e.g., most recent or current) cursor position matters. Thus, if message queue 212 has more than one state message for cursor position, all previous state messages indicating cursor position can be deleted. Replaceable or deletable state messages can be messages of the same type that indicate a change to the same attribute of the same object. Since only the latest (e.g., most recent, current) state is needed for synchronization, earlier messages that indicate an earlier state of an attribute of an object can be deleted. Additionally, some state messages are combinable and replaceable. For example, background color state (e.g., attribute) for different chat channels (e.g., object) is combinable, while background color state for the same chat channel is replaceable. Thus, a background color state message is a combinable and replaceable state message type.

Referring to FIG. 3A, state message queue 300 can include state messages 302-314. Messages 306 and 312 are cursor position state messages. Since at any given time the cursor (e.g., object) can only be associated with one position (e.g., attribute), only the latest cursor position matters. Thus, because cursor position message 312 was received after cursor position message 306, the earlier cursor position message 306 can be deleted from the state message queue resulting in state message queue 320 having one less message than message queue 300.

Referring to FIG. 3B, state message queue 320 can include read state messages 304 and 310. Since read state messages are combinable, the read state information in message 304, e.g., indicating that chat message 132 (e.g., object) has been read (e.g., attribute), can be combined with the read state information in message 310, e.g., indicating that chat message 133 has been read, so that message 310 contains the read state information for both chat message 132 and 133. By combining the read state messages into a single message, the size of state message queue 320 is further reduced to produce state message queue 340 that contains one less message than message queue 320 and two fewer state messages than state message queue 300.

Referring to FIG. 3C, state message queue 340 can include background color state messages 302, 308 and 314. Background color state messages 302, 308 and 314 can be combinable and replaceable. For example, because a chat channel (e.g., object) can only have one background color (e.g., attribute), only the latest (e.g., most recent) background color state message for the same chat channel (e.g., changing the Family channel, e.g., channel ID=2, green, then orange, then blue) will be preserved in message queue 340; previous background color state messages will be deleted. For example, message queue 340 includes background color state messages 302 and 314 that indicate the background color state (e.g., Blue; Orange) for channel ID=2. Because color state messages 302 and 314 refer to the same chat channel (e.g., channel 2), only the most recent color state message 314 will be preserved; message 302 will be deleted. Additionally, because background color state message 308 refers to a different chat channel (e.g., channel ID=3) than background color state message 314, background color state message 308 can be combined with message 314 so that message 314 includes the background color state information for both channel 2 and channel 3, as illustrated by message queue 360. Thus, by deleting and combining messages in the state message queue 300 (e.g., message queue 212), message queue 300 can be reduced in size from 7 state messages to a mere 3 state messages as shown in message queue 360. Accordingly, the storage space required to store the state messages can be reduced and the amount of bandwidth required to synchronize client devices can also be reduced.

Example Process

Figure 4:
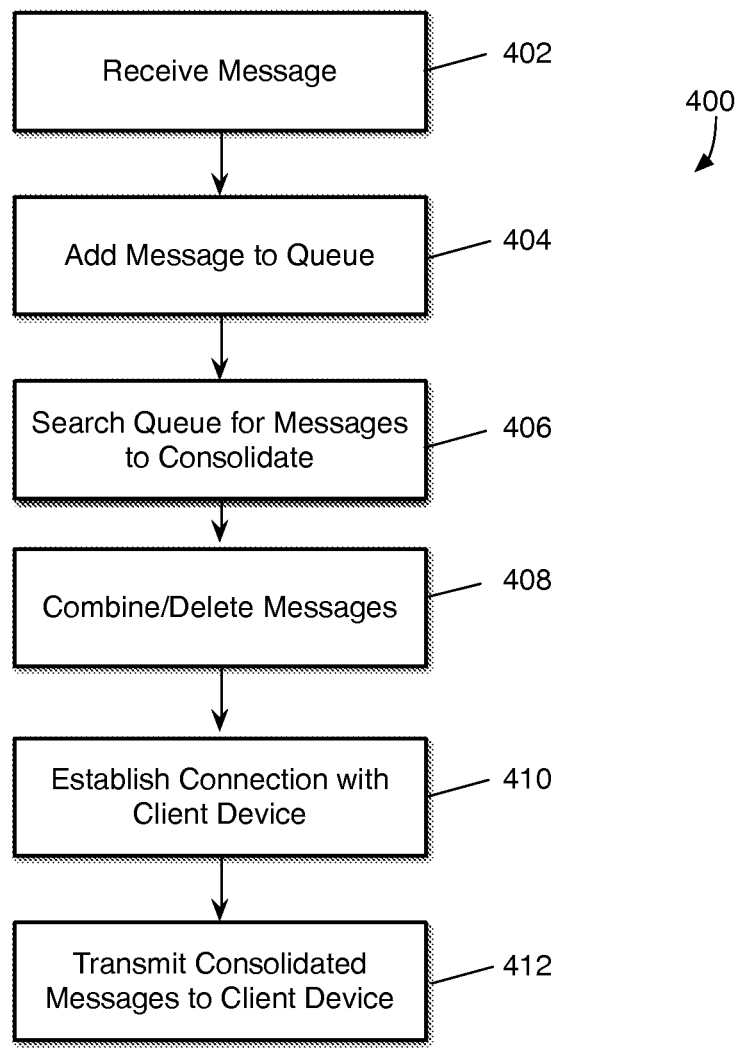
FIG. 4 is a flow diagram of an example process for consolidating messages in a message queue.

FIG. 4 is a flow diagram of an example process 400 for consolidating messages in a message queue. At step 402, a server (e.g., chat server 210) can receive a state message from a client device (e.g., device 220). The state message can include state information for synchronizing the state of applications across multiple client devices, for example. The state message can include state information for synchronizing a chat client application or GUI across multiple devices.

At step 404, the server can add the state message to a message queue maintained by the server. For example, the server can maintain a message queue for each client device associated with a user. The server can determine whether a connection to a particular client device currently exists. When the server determines that the server does not have a current connection to the particular client device, the server can add the received state message to the message queue associated with the particular client device so that the state message can be delivered to the particular client when the connection to the client device is reestablished.

At step 406, the server can search the message queue for messages to consolidate. For example, upon receipt of the message at step 402, the server can find other messages in the message queue of the same type (e.g., background color message, read/unread message, cursor position message, etc.).

At step 408, the server can combine and/or delete messages of the same message type in the message queue. In some implementations, the server can delete previous messages in the message queue based on the received message. For example, once the server identifies other messages of the same type, the server can identify messages that change an attribute of the same object. For example, the server can identify messages that change the color of a particular chat channel, or the server can identify messages that change the read state of the same chat message, or the server can identify messages that change or toggle some other attribute of an identified object. Once the server identifies messages of the same type that change an attribute of the same (e.g., a particular) object (e.g., chat message, chat channel, etc.), the server can save the most recent message and delete previous messages in the message queue that have the same message type and object. For example, if the user changes the color of a particular chat channel several times, only the most recent color change needs to be saved. Thus, earlier color change state messages can be deleted.

In some implementations, the server can combine previous messages in the message queue based on the received message. For example, once the server identifies other messages of the same type, the server can identify messages that change an attribute of different objects. For example, the server can identify messages that change the color of a different chat channels, or the server can identify messages that change the read state of the different chat messages, or the server can identify messages that change or toggle some other attribute of different objects. Once the server identifies messages of the same type (e.g., background color state, read state, cursor position, etc.) that change an attribute of different objects (e.g., chat message, chat channel, etc.), the server can combine the messages in the message queue that have the same message type and but are associated with different objects. For example, if the user changes the color of a particular chat channel and then changes the color of another chat channel, the color change state messages for each different chat channel can be combined into a single color change state message. Thus, state messages of the same type but associated with different objects can be combined into a single state message to free memory resources required to store the message queue.

At step 410, the server can establish a connection with the client device associated with the message queue. The client device can connect to a network that provides access to the server. Once the client is back online, the server can receive and send messages to the client device.

At step 412, the server can transmit the consolidated messages to the client device. For example, the server can transmit to the client device the messages remaining in the message queue after message consolidation (e.g., combination or deletion) has been performed. Thus, the state messages transmitted to the client can be a combination of state messages received by the server device or the last state message of a particular type received by the server device. By consolidating (e.g., combining and/or deleting) the state messages, the amount of bandwidth required to transmit the state messages can be reduced.

Example System Architecture

Figure 5:
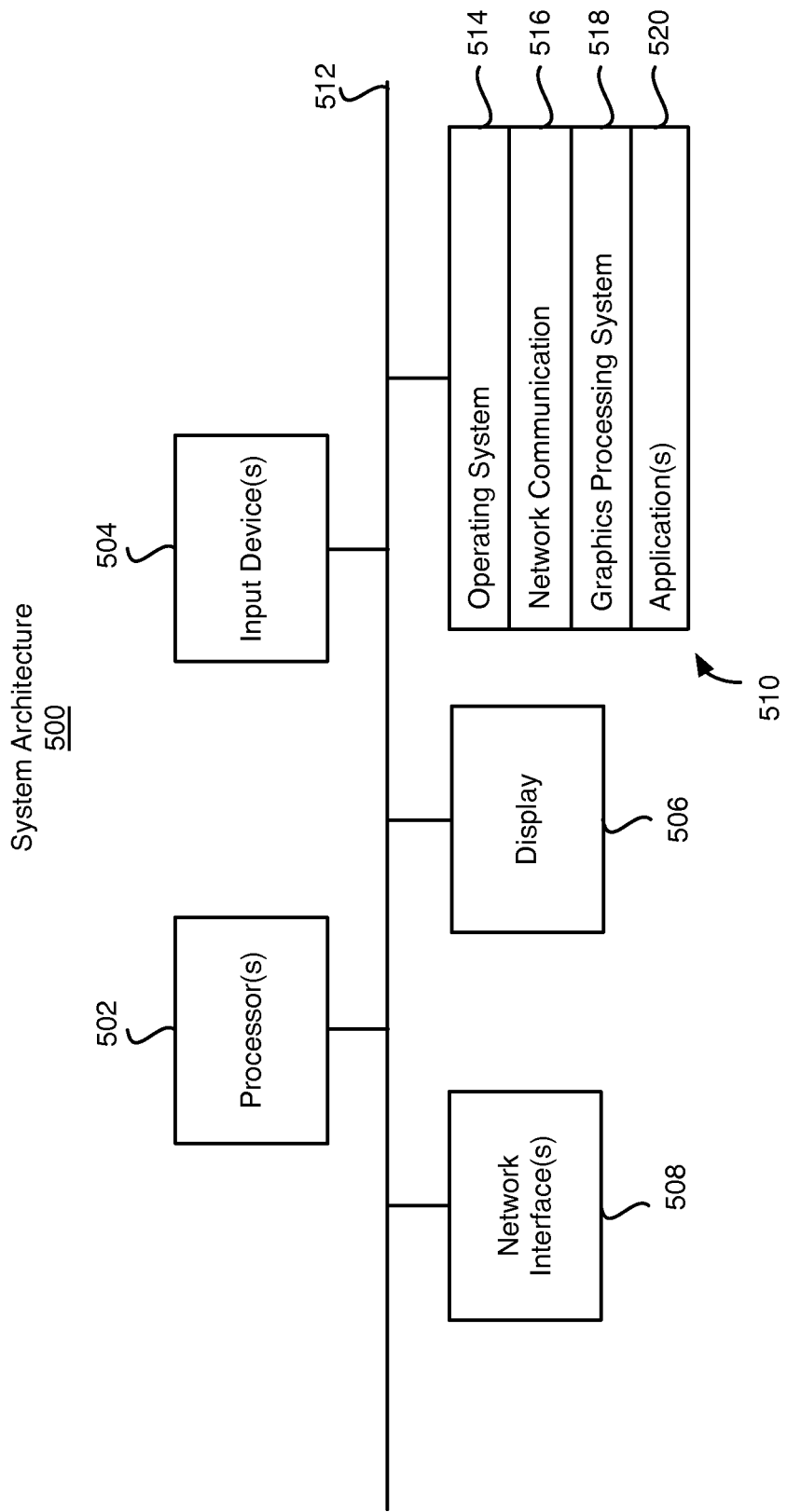
FIG. 5 is a block diagram of an example system architecture implementing the features and processes of FIGS. 1-4.

FIG. 5 is a block diagram of an example system architecture implementing the features and processes of FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire.

Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 510 can include various instructions 514 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.).

A graphics processing system 518 can include instructions that provide graphics and image processing capabilities. For example, the graphics processing system 518 can implement the processes described with reference to FIG. 1.

Application(s) 520 can be an application that uses or implements the processes described in reference to FIGS. 1-4. For example, application(s) 520 can include chat applications (e.g., client and/or server applications) that implement the chat system described above. In particular, application(s) 520 can include the server chat application or process that consolidates messages in a message queue. These processes can also be implemented in operating system 514.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:
1. A method comprising:
receiving, at a chat server within a synchronized content management system, a new state message including state information for a chat state taking place within a chat application associated with the synchronized content management system at a first client device;

storing, at the synchronized content management system, the new state message in a message queue within the chat server that stores a plurality of state messages;

determining, at the synchronized content management system, a state message type for the new state message;

identifying two or more state messages from the plurality of state messages in the message queue having the state message type;

consolidating the two or more state messages that have the state message type into a single state message; and storing the single state message in the message queue.

2. The method of claim 1, wherein the consolidating comprises:

determining that at least one of the identified two or more state messages have a replaceable state message type; and deleting at least one of the identified two or more state messages that are replaceable, keeping only the most recently received of the replaceable state message types when the replaceable state message types refer to a particular attribute of a particular object.

3. The method of claim 1, wherein the consolidating comprises:

combining two or more messages in the message queue when the one or two or more messages refer to a particular attribute of different objects.

4. The method of claim 1, wherein the message queue has a first size before the consolidating and a second size after the consolidating and wherein the second size is smaller than the first size.

5. The method of claim 1, further comprising transmitting the single message to a second client device.

6. A non-transitory computer-readable medium including one or more sequences of instructions which, when executed by one or more processors, causes:

receiving, at a chat server within a synchronized content management system, a new state message including state information for a chat state taking place within a chat application associated with the synchronized content management system at a first client device;

storing, at the synchronized content management system, the new state message in a message queue within the chat server that stores a plurality of state messages;

determining, at the synchronized content management system, a state message type for the new state message;

identifying two or more state messages from the plurality of state messages in the message queue having the state message type;

consolidating the two or more state messages that have the state message type into a single state message; and storing the single state message in the message queue.

7. The non-transitory computer-readable medium of claim 6, wherein the instructions that cause consolidating comprise instructions that cause:

determining that at least one of the identified two or more state messages have a replaceable state message type; and deleting at least one of the identified two or more state messages that are replaceable, keeping only the most recently received of the replaceable state message types when the replaceable state message types refer to a particular attribute of a particular object.

8. The non-transitory computer-readable medium of claim 6, wherein the instructions that cause consolidating comprise instructions that cause:

combining two or more messages in the message queue when the one or two or more messages refer to a particular attribute of different objects.

9. The non-transitory computer-readable medium of claim 6, wherein the message queue has a first size before the consolidating and a second size after the consolidating and wherein the second size is smaller than the first size.

10. The non-transitory computer-readable medium of claim 6, wherein the instructions cause transmitting the single state message to a second client device.

11. A system comprising:

one or more processors; and a non-transitory computer-readable medium including one or more sequences of instructions which, when executed by the one or more processors, causes:

receiving, at a chat server within a synchronized content management system, a new state message including state information for a chat state taking place within a chat application at a first client device;

storing, at the synchronized content management system, the new state message in a message queue within the chat server that stores a plurality of state messages;

determining, at the synchronized content management system, a state message type for the new state message;

identifying two or more state messages from the plurality of state messages in the message queue having the state message type;

consolidating the two or more state messages that have the state message type into a single state message; and storing the single state message in the message queue.

12. The system of claim 11, wherein the instructions that cause consolidating comprise instructions that cause:

determining that at least one of the identified two or more state messages have a replaceable state message type; and deleting at least one of the identified two or more state messages that are replaceable, keeping only the most recently received of the replaceable state message types when the replaceable state message types refer to a particular attribute of a particular object.

13. The system of claim 11, wherein the instructions that cause consolidating comprise instructions that cause:

combining two or more messages in the message queue when the one or two or more messages refer to a particular attribute of different objects.

14. The system of claim 11, wherein the message queue has a first size before the consolidating and a second size after the consolidating and wherein the second size is smaller than the first size.

15. The system of claim 11, wherein the instructions cause transmitting the single state message to a second client device.

* * * * *